(12) United States Patent
Aimi et al.

(10) Patent No.: US 7,518,088 B2
(45) Date of Patent: Apr. 14, 2009

(54) CONTROLLER FOR ARC WELDING ROBOT

(75) Inventors: Kei Aimi, Osaka (JP); Hidetoshi Oyama, Osaka (JP); Kazunori Matsumoto, Osaka (JP); Tatsuya Ikeda, Hyogo (JP); Yasushi Mukai, Osaka (JP)

(73) Assignee: Panasonic Corporation, Osaka (JP)

( * ) Notice: Subject to any disclaimer, the term of this patent is extended or adjusted under 35 U.S.C. 154(b) by 134 days.

(21) Appl. No.: 10/569,895

(22) PCT Filed: Jun. 27, 2005

(86) PCT No.: PCT/JP2005/011769

§ 371 (c)(1),
(2), (4) Date: Feb. 28, 2006

(87) PCT Pub. No.: WO2006/006384

PCT Pub. Date: Jan. 19, 2006

(65) Prior Publication Data

US 2007/0007262 A1    Jan. 11, 2007

(30) Foreign Application Priority Data

Jul. 13, 2004    (JP) .............................. 2004-205666

(51) Int. Cl.
*B23K 9/10* (2006.01)
(52) U.S. Cl. ................................. 219/130.21
(58) Field of Classification Search .............. 219/130.5; 901/49
See application file for complete search history.

(56) References Cited

U.S. PATENT DOCUMENTS 4,897,773 A * 1/1990 Bilczo .................... 363/56.06

(Continued)

FOREIGN PATENT DOCUMENTS

JP    61-014079    1/1986

(Continued)

OTHER PUBLICATIONS

Beckhoff Industrie Elektronik, "Stop and Emergency Stop functions with AX2000", Printed in the Federal Republic of Germany Jun. 2000.*

(Continued)

*Primary Examiner*—Kiley Stoner
*Assistant Examiner*—Nicholas P D'Aniello
(74) *Attorney, Agent, or Firm*—Pearne & Gordon LLP (57) ABSTRACT

In a conventional arc welding robot control unit, since an emergency stop circuit for a robot and an emergency stop circuit for a welding machine exist independently of each other, not only the circuit configuration thereof is long but also the emergency stop enforcing processings and emergency stop removing processings are executed individually. To solve these problems, according to the invention, there is provided an arc welding robot control unit which comprises an inverter circuit 1 for enforcing arc welding, main power supply switches 2a-2c for turning on and off a main power supply used to supply power to the inverter circuit 1, a main power supply control part 3 for controlling the main power supply switches 2a-2c, and an emergency stop button 4 for emergency stopping the operation of a robot, wherein, when the emergency stop button 4 is depressed to thereby put the robot into emergency stop, the main power supply switches 2a-2c can be turned off in linking with the robot emergency stop.

6 Claims, 5 Drawing Sheets

U.S. PATENT DOCUMENTS

| | | | |
|---|---|---|---|
| 5,945,011 A * | 8/1999 | Takano et al. | 219/108 |
| 6,439,961 B1 * | 8/2002 | Hammond et al. | 451/5 |
| 6,570,355 B2 * | 5/2003 | Morita et al. | 318/563 |
| 2002/0166849 A1 * | 11/2002 | Sievert et al. | 219/130.1 |

FOREIGN PATENT DOCUMENTS

| | | |
|---|---|---|
| JP | 5-39831 | 10/1993 |
| JP | 5-270751 | 10/1993 |
| JP | 05-277731 | 10/1993 |
| JP | 7-256585 | 10/1995 |
| JP | 2674358 | 7/1997 |

OTHER PUBLICATIONS

Chinese Office action with English translation dated Jan. 1, 2004.

Lianxin Zhang et al. "Open Arc Welding Robot Controlling System Based on PMAC" Dec. 2003, vol. 24. China Academic Journal Electronic Publishing House.

Chen Liding et al. "Analyze of Typical Control Circuit According with Safety for Man and Machine in Machining Facility" China Academic Journal Electronic Publishing House.

Zhu Changyou et al. "Analysis on the Power Circuit in the Welding Robot System" China Academic Journal Electronic Publishing House.

* cited by examiner

CONTROLLER FOR ARC WELDING ROBOT

FIELD OF THE INVENTION

The invention relates to a control unit for controlling a power supply of an arc-welding robot composed of a welding machine and a robot that are united together as an integral body.

BACKGROUND OF THE INVENTION

In recent years, as a control unit for controlling an arc welding robot, there has been employed a control unit of a type having a built-in welding machine, in order to improve the operation environment thereof, reduce the installation space thereof, simplify the connection between the welding machine and robot, make it easy to use, and enhance the maintenance thereof (see the patent literature 1, for example).

Figure 4:
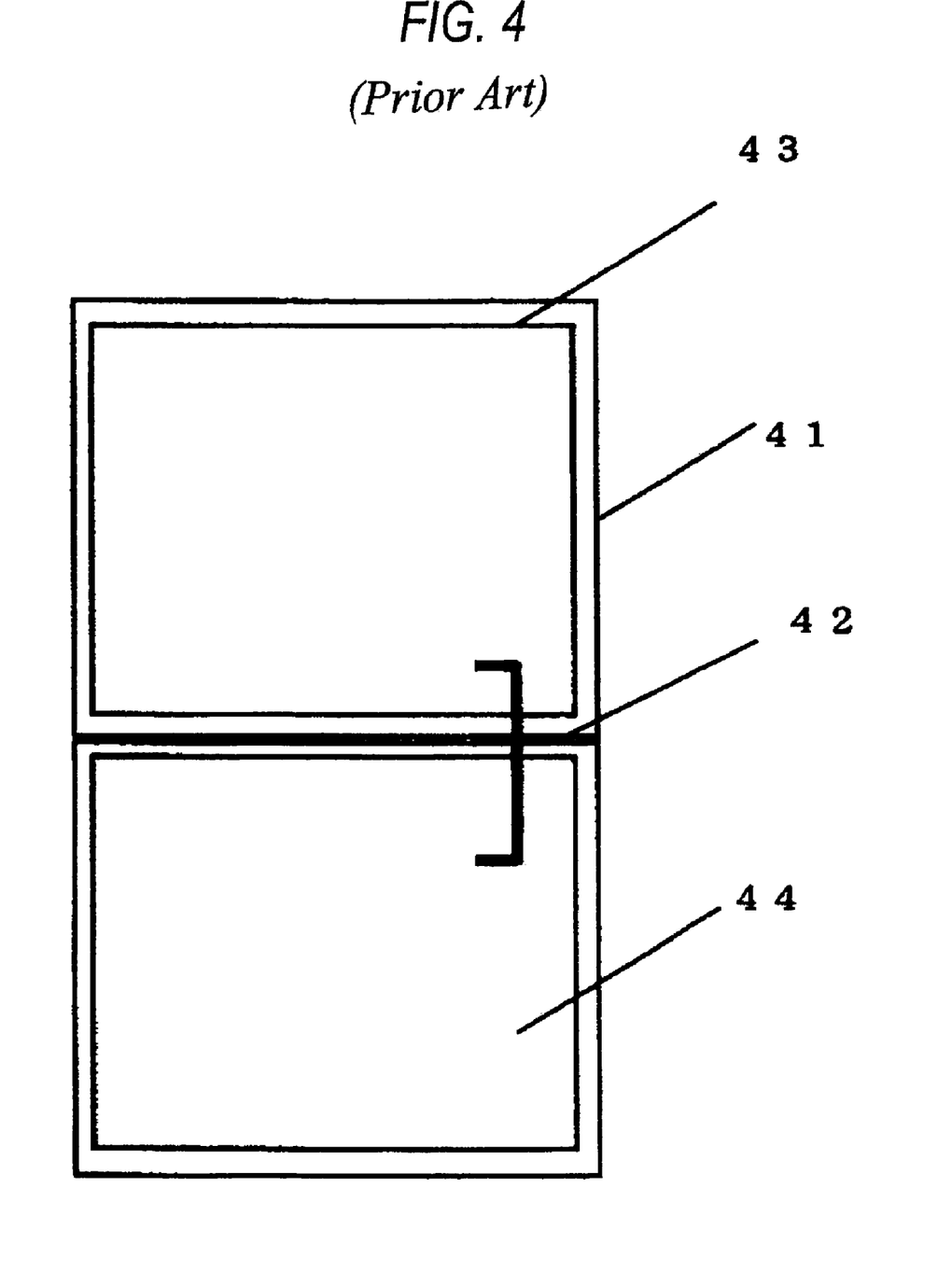
FIG. 4 is a schematic view of a conventional arc welding robot having a built-in welding machine.

FIG. 4 shows the above-mentioned control unit for controlling an arc welding robot with a built-in welding machine. In FIG. 4, reference character 41 designates a storage case for storing therein a robot controller unit and a welding power supply in an integral manner, while the storage case 41 is divided to two stages by an electromagnetic shield plate 42. With the electromagnetic shield plate 42 as the boundary thereof, the lower stage is used as a storage portion for storing an arc welding power supply 44 therein, whereas the upper stage is used as a storage portion for storing a robot controller unit 43 therein. In this manner, since the robot controller unit 43 and arc welding power supply 44 are stored in the same storage case, not only the arc welding robot control unit can be made easy to handle but also the installation space thereof can be reduced greatly Also, as a robot control unit, there has been employed a robot control unit of a type which, in order to secure safety in the maintenance operation thereof, can cut off power supply to the servo amplifier of the robot using an emergency stop signal (see the patent literature 2, for example).

Figure 5:
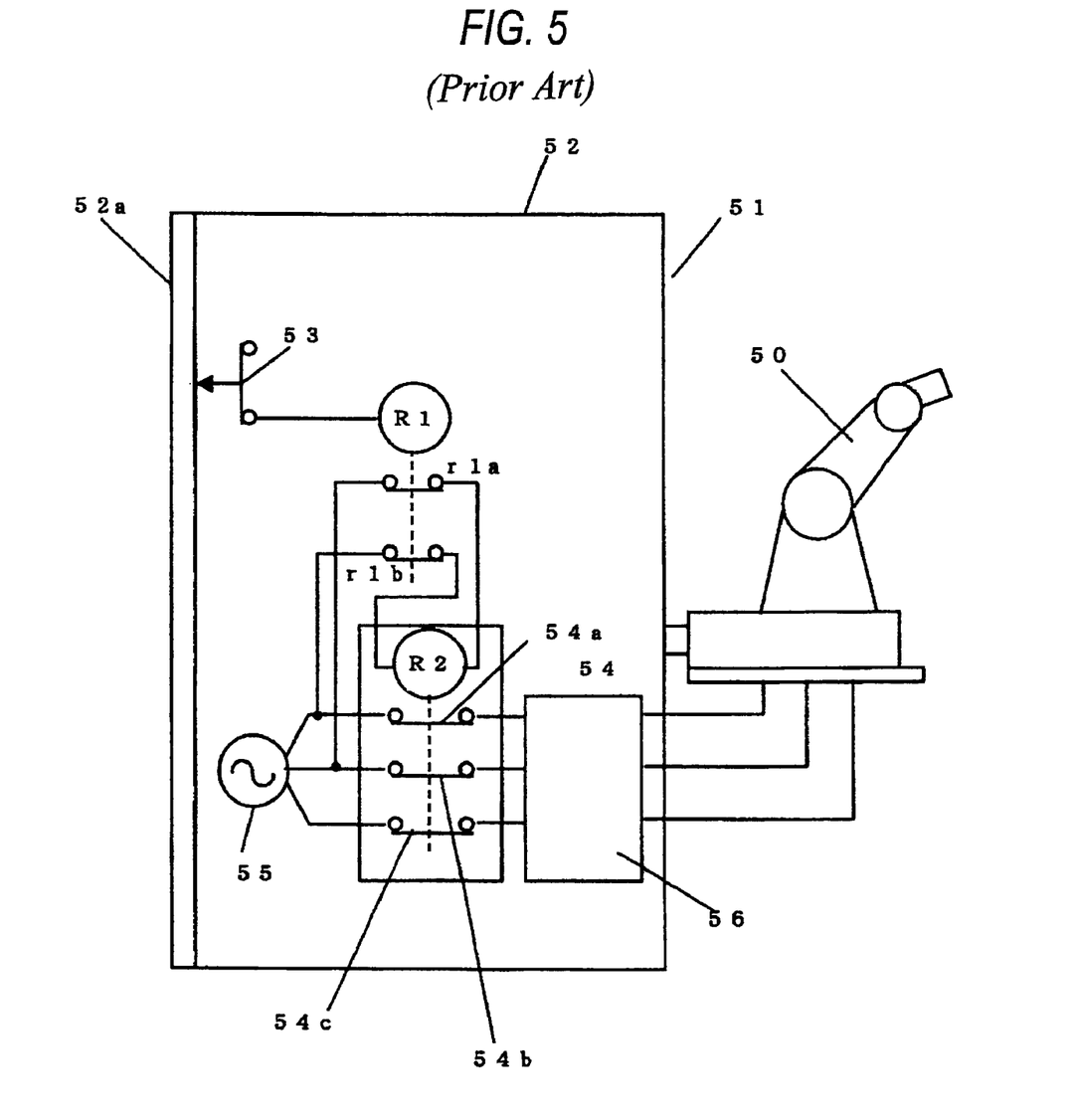
FIG. 5 is a diagrammatic view of a power cut-off method using an emergency stop switch in a conventional robot control unit.

FIG. 5 shows the above-mentioned conventional robot control unit. Specifically, in a box body 52 of a robot control unit 51 connected to a robot movable part 50, there is provided a door interlock switch 53. The door interlock switch 53, when the panel 52a of the box body 52 is removed, outputs an emergency stop signal to a contact circuit (not shown) for controlling the energization of a coil R1 to thereby de-energize the coil R1. Owing to this, contacts r1a, r1b are opened and the power supply to a coil R2 is cut off, so that the coil R2 is also de-energized. And, contacts 54a to 54c within an electromagnetic contact device 54 are opened respectively to cut off the power supply to a servo amplifier 56 from a power supply 55, thereby stopping the driving of a servo motor provided in the robot movable part 50.

In this manner, in the maintenance operation, the robot movable part 50 can be made immovable.
Patent literature: JP 2674358 publication (FIG. 1)
Patent literature: JP Hei-7-256585 publication (FIG. 1)

DISCLOSURE OF THE INVENTION

Problems to be Solved by the Invention

However, in the above-mentioned conventional arc welding robot control unit, since an emergency stop circuit for the robot and an emergency stop circuit for the welding machine are arranged separately from each other, not only the circuit configuration thereof is long but also the emergency stop enforcing processings and the emergency stop removing processings are carried out independently. Owing to this, every time when the robot emergency stop operations are performed, the on/off of the welding outputs must be repeated in the power supply portion of the welding machine, resulting in the complicated operation of the arc welding robot control unit.

Also, the welding machine has another problem that, in order to be able to provide a welding output regardless of the need for the welding output, it must continue to supply electric power wastefully to an inverter circuit and its peripheral circuits.

In view of the problems found in the above-mentioned conventional arc welding robot control unit, it is an object of the invention to provide an arc welding robot control unit which not only can cut off the output of a welding machine synchronously with the emergency stop of a robot but also can control power supply to the welding power supply part of the welding machine according to the need for the welding output of the welding machine.

Means for Solving the Problems

In solving the above problems, according to the invention, there is provided an arc welding robot control unit for controlling the output of a welding machine and the operation of a robot in an integral manner, comprising: an inverter circuit for enforcing arc welding, a main power supply switch for turning on and off a main power supply which is used to supply power to the inverter circuit, a main power supply control part for controlling the main power supply switch, and an emergency stop button for emergency stopping the operation of the robot. And, thanks to this structure, when the emergency stop button is depressed and the robot is thereby emergency stopped, in linking with this robot emergency stop, the main power supply switch is turned off.

Also, according to the invention, there is provided an arc welding robot control unit, which comprises: an inverter circuit for arc welding; a capacitor for driving the inverter circuit stably; an opening/closing switch for opening and closing a standby charge path for standby charging the capacitor; a main power supply switch for turning on and off a main power supply used to supply power to the inverter circuit; a main power supply control part for controlling the main power supply switch and the opening/closing switch; and, an emergency stop button for emergency stopping the operation of the robot. And, according to this structure, when the emergency stop button is depressed and the robot is thereby emergency stopped, in linking with this robot emergency stop, the main power supply switch is turned off and the opening/closing switch is also opened.

Also, according to the invention, there is provided an arc welding robot control unit, which comprises: a robot control part; an inverter circuit for enforcing arc welding; a main power supply switch for turning on and off a main power supply used to supply power to the inverter circuit; a manually operated button for turning on and off the main power supply; a main power supply control part for controlling the on/off of the main power supply in accordance with an instruction from the robot control part; and, an emergency stop button for emergency stopping the operation of a robot. According to this structure, when the emergency stop button is depressed and the robot is thereby emergency stopped, in linking with this robot emergency stop, the main power supply switch is turned off.

Further, according to the invention, there is provided an arc welding robot control unit, which comprises: a robot control part; an inverter circuit for enforcing arc welding; a capacitor for driving the inverter circuit stably; an opening/closing switch for opening and closing a standby charge path for standby charging the capacitor; a main power supply switch for turning on and off a main power supply used to supply power to the inverter circuit; a manually operated button for turning on and off the main power supply; a main power supply control part for controlling the on/off of the main power supply in accordance with an instruction from the robot control part; and, an emergency stop button for emergency stopping the operation of a robot. According to this structure, when the emergency stop button is depressed and the robot is thereby emergency stopped, in linking with this robot emergency stop, the main power supply switch is turned off and the opening/closing switch is also opened.

Effects of the Invention

As described above, the invention not only can cut off the output of the welding machine simultaneously with the emergency stop of the robot but also can stop the welding machine output safely and positively.

BEST MODE FOR CARRYING OUT THE INVENTION

Embodiment 1

Figure 1:
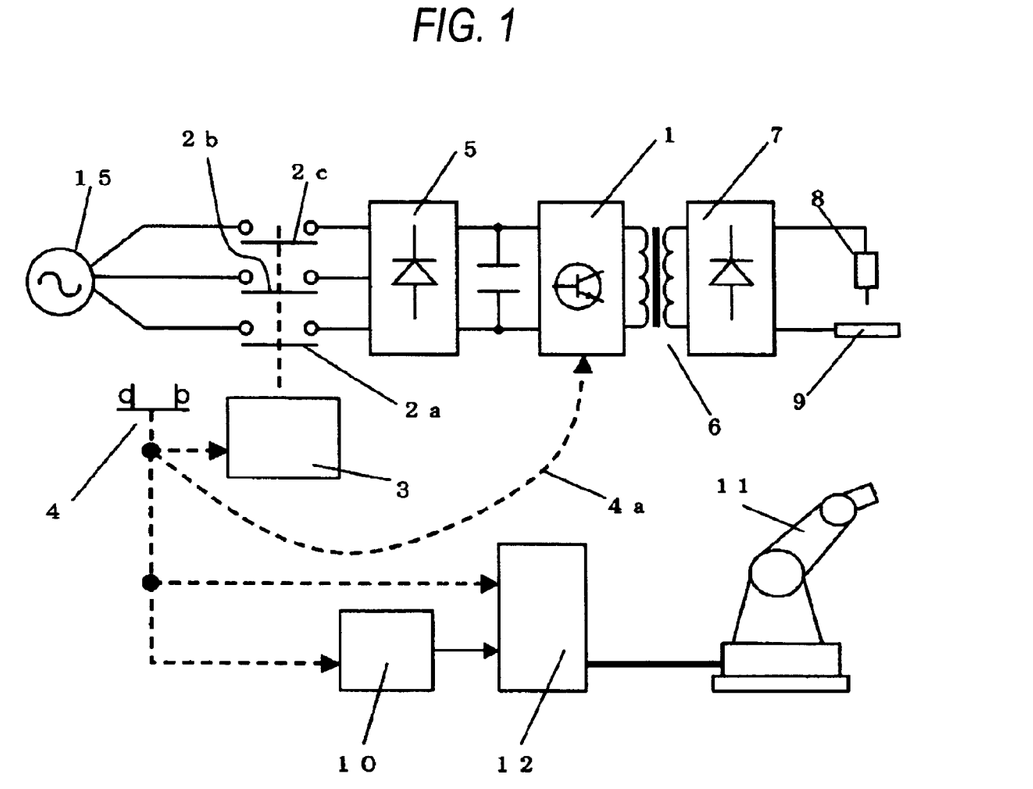
FIG. 1 is a diagrammatic view of an embodiment 1 of an arc welding robot control unit according to the invention.

Now, description will be given below of an arc welding robot control unit according to an embodiment 1 of the invention with reference to FIG. 1. FIG. 1 shows an arc welding robot control unit according to the embodiment 1 of the invention, in which reference character 1 designates an inverter circuit for controlling an output for execution of arc welding, 2a-2c main power supply switches for turning on and off ac power from a main power supply 15 used to supply power to the inverter circuit, 3 a main power supply control part for controlling the main power supply switches 2a-2c, 4 an emergency stop switch for emergency stopping the robot, 5 a rectifier circuit for rectifying the ac power to generate dc power to be supplied to the inverter circuit 1, 6 a power converting transformer for taking out a large current form the output of the inverter circuit, 7 a secondary rectifier circuit for rectifying the output of the transformer 6, 8 a welding torch, 9 a base metal to be welded, 10 a robot control part for controlling the operation and movement of the robot, 11 a robot movable part, and 12 a servo amplifier for supplying power necessary to operate the robot movable part 11 in accordance with a control signal from the robot control part 10, respectively.

Next, description will be given below of the operation of the above-structured arc welding robot control unit.

Firstly, when power is turned on with the emergency stop switch 4 not depressed, since an emergency stop state is removed, the main power supply control part 3 closes the main power supply switches 2a-2c to thereby supply ac power. And, the thus input ac power is rectified to dc power by the rectifier circuit 5, it is then supplied to inverter circuit 1 as the dc power, the inverter circuit 1 inverter controls the dc power to obtain a desired welding output, and then the inverter circuit 1 supplies ac power of a large current through the power converting transformer 6. And, this ac power is converted to dc power through the secondary rectifier circuit 7 and the dc power is supplied as power which is necessary for arc welding to be executed between the welding torch 8 and the welding base metal 9.

Also, in the robot, the servo amplifier 12 is controlled in accordance with a control signal (generally, there is used a PWM signal) from the robot control part 10 to thereby supply a motor current to be supplied to a motor (not shown) carried on board the robot movable part 11, with the result that the desired robot operation can be realized.

Next, when the emergency stop switch 4 is pressed down, to stop the welding machine output, the inverter circuit 1 executes output stop control. Referring to an example of a method for enforcing this output stop control, when the emergency stop switch 4 is pressed down, an emergency stop signal 4a is issued to the inverter circuit 1 to turn off a circuit of a base current supply part of a transistor (not shown) disposed in the inverter circuit 1, thereby stopping the welding machine output. At the then time, simultaneously with this, the main power supply control part 3 opens the contacts of the main power supply switches 2a-2c to thereby cut off the power supply to the inverter circuit 1.

Also, simultaneously with this, in the robot, the robot control part 10, which has received an emergency stop signal from the emergency stop switch 4, controls and stops the motor carried on board the robot movable part 11 as well as stops the PWM signal for motor control. At the same time, the servo amplifier 12, in accordance with the emergency stop signal, cuts off the supply of the motor current necessary for driving the motor, thereby being able to stop the robot movable part 11 safely.

In this manner, when the emergency stop switch 4 is depressed, the robot is stopped safely and the welding machine output is stopped simultaneously.

By the way, in the present embodiment, to simplify the description thereof, only the emergency switch 4 is used to emergency stop the robot. However, this is not limitative but switches and signals associated with the safe stop of the robot may be connected in series with the emergency stop switch 4, that is, two or more switches and signals may also be used.

As described above, when the emergency stop switch is depressed, the depressed state of the emergency stop switch is detected and, simultaneously with the emergency stop of the robot, the welding machine output is stopped not only by the inverter control but also by cutting off the power necessary for the welding machine output, so that the welding machine output can be stopped safely and positively.

Embodiment 2

Figure 2:
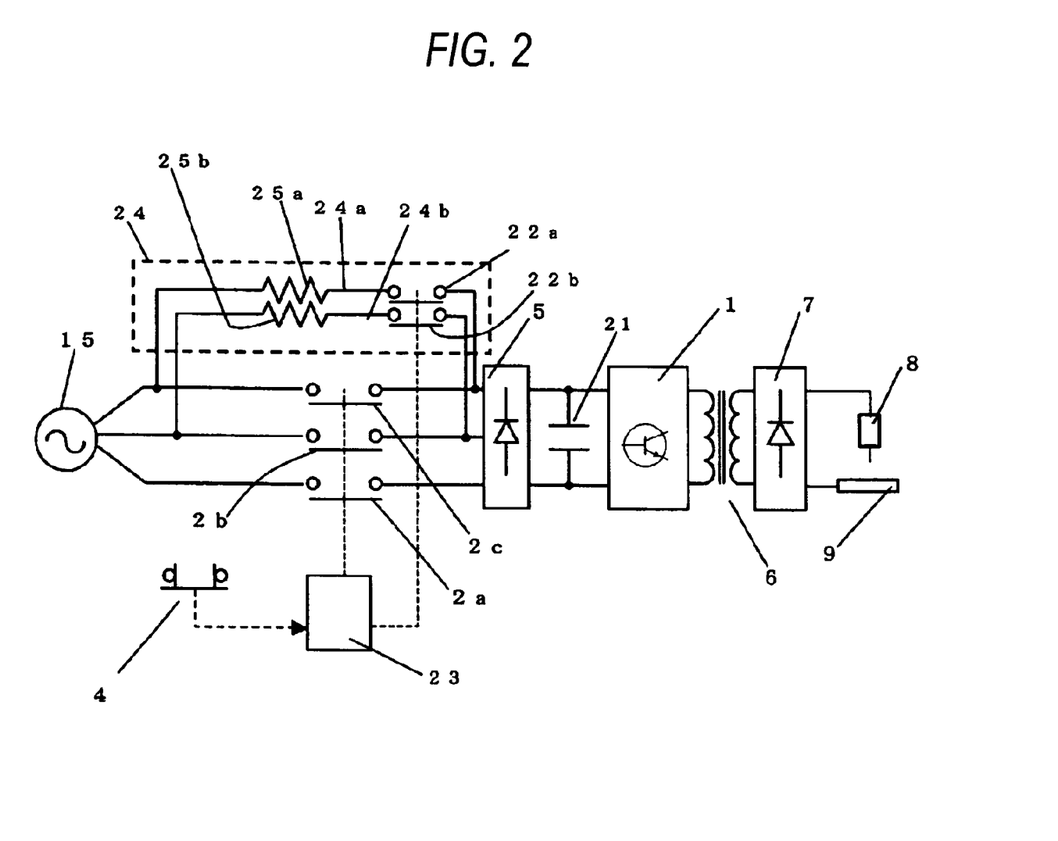
FIG. 2 is a diagrammatic view of an embodiment 2 of an arc welding robot control unit according to the invention.

In the present embodiment, parts thereof similar in structure to those employed in the embodiment 1 are given the same designations and thus the duplicate detailed description thereof is omitted here. In FIG. 2, reference character 21 designates a capacitor which is used to drive the inverter circuit stably, 22a and 22b respectively stand for opening/closing switches used to open and close the standby charge path 24 of the capacitor 21, and 23 expresses a main power supply control part for controlling the main power supply switches 2a-2c and opening/closing switches 22a, 22b.

The present embodiment is different from the embodiment 1 in that there is provided the standby charge path 24 in the power supply passage to the inverter circuit 1 as well as the standby charge path 24 includes bypass paths 24a and 24b for the main power supply switches 2a-2c including the opening/closing switches 22a and 22b to be controlled by the main power supply part 23.

Next, description will be given below of the operation of the above-structured arc welding robot control unit.

In a state where the emergency stop switch 4 is not depressed, the main power supply part 23 previously closes the opening/closing switches 22a, 22b to close the bypass paths 24a, 24b of the main power supply switches 2a-2c. In the bypass paths 24a and 24b, there are inserted resistors 25a and 25b respectively; and, a current is charged into the capacitor 21 while the resistors 25a and 25b are restricting the current to be charged into the capacitor 21. And, when the level of the current charged into the capacitor 21 rises, the main power supply control part 23 closes the main power supply switches 2a-2c to thereby establish a power supply path and also opens the opening/closing switches 22a and 22b in the standby charge path 24 to thereby cut off the power supply path using the standby charge path 24 including the bypass paths 24a and 24b. Because of this, a rush current occurring when the main power supply switches 2a-2c are closed can be prevented from flowing into the capacitor 21.

Next, when the emergency stop switch 4 is depressed, the main power supply control part 23 turns off the main power supply switches 2a-2c and, at the same time, opens the opening/closing switches 22a and 22b to thereby cut off the power supply to the inverter circuit 1, so that the welding machine output is stopped.

By the way, although the illustration and description thereof are omitted here, when the emergency stop switch 4 is depressed, the robot emergency stop operation is put into work simultaneously as described in the embodiment 1 with reference FIG. 1.

Also, in the present embodiment, to simplify the description thereof, the standby charge path 24 uses only two of the three phases of the ac power supply and the opening/closing switches have two contacts. However, the standby charge path may use the three phases and thus the opening/closing switches may have three contacts.

As described above, according to the present embodiment, even in the case which includes a capacitor for driving an inverter circuit stably, by detecting the depressed state of the emergency stop switch, the welding machine output can be stopped through control of the inverter circuit, the power necessary for the welding machine output can be cut off, and the standby charge path to the capacitor can be cut off. This makes it possible not only to emergency stop the robot but also to stop the welding machine output safely and positively.

Embodiment 3

Figure 3:
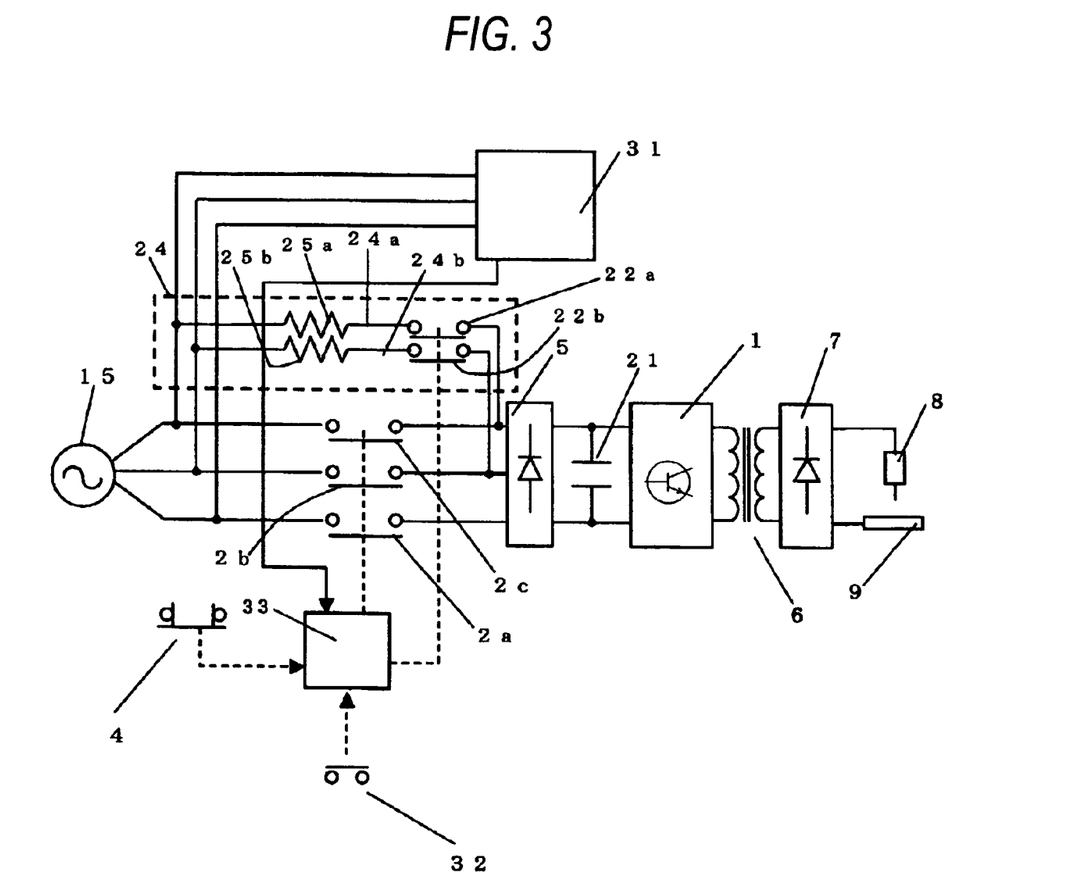
FIG. 3 is a diagrammatic view of an embodiment 3 of an arc welding robot control unit according to the invention.

In the present embodiment, parts thereof similar in structure to those used in the embodiments 1 and 2 are given the same designations and thus the duplicate detailed description thereof is omitted here. In FIG. 3, reference character 31 designates a robot control part for controlling a robot, and 32 stands for a manually operated button for turning on/off the main power supply of the whole robot control unit.

Now, description will be given below of the operation of the above-structured arc welding robot control unit.

Firstly, when the emergency stop switch 4 is depressed (an emergency stop state), regardless of the operation of the manually operated button 32, the main power supply control part 33 turns off the main power supply switches 2a-2c and also opens the opening/closing switches 22a and 22b to thereby cut off the power supply path to the inverter circuit 1.

Also, in a state where the main power supply switches 2a-2c are on and the emergency stop switch 4 is not depressed (in a state where the main power supply is on), if the manually operated button 32 is pressed down, the main power supply control part 33 turns off the main power supply switches 2a-2c and also opens the opening/closing switches 22a and 22b, thereby cutting off the power supply to the inverter circuit 1 and holding the main-power-supply-switch-on state.

In this state, that is, in a state where the emergency stop switch 4 is removed and the main power supply switch 2 is off, if the manually operated button 32 is depressed again, the main power supply control part 33 firstly, in order to establish the standby 10 charge path 24 to the capacitor 21, closes the opening/closing switches 22a and 22b to thereby start the standby charge to the capacitor 21.

When the level of charge to the capacitor 21 rises, the main power supply control part 33 closes the main power supply switches 2a-2c to thereby establish a power supply path using the main power supply switches 2a-2c and also opens the opening/closing switches 22a and 22b in the standby charge path 24 to thereby open the bypass paths 24a and 24b and thus cut off a power supply path using the standby charge path 24.

Next, description will be given below of an operation when the robot control part 31 instructs the main power supply control part 33 that the main power supply switches 2a-2c cannot be turned on. By the way, based on an operation executed by an operator, the robot control part 31 can change its instruction to the main power supply control part 33 according to whether the welding machine output is necessary or not. That is, according to cases, the robot control part 31 can instruct the main power supply control part 33 through the operation of the manually-operated switches 32 whether the on/off of the main power supply switches 2a-2c is allowed or prohibited. Here, referring to a case in which the welding machine output is necessary according to the operation to be executed by the operator, for example, there can be taken a case in which a teaching state is switched over to an arc test state.

Firstly, description will be given below of an operation to be executed when the robot control part 31 instructs the main power supply control part 33 to the effect that to turn on the main power supply switches 2a-2c is allowed.

In the emergency stop removed state, if the manually operated button 32 is depressed, the main power supply part 33 holds its state as a state allowing the main power supply switches 2a-2c to be turned on. However, in this case, since the robot control part 31 is instructing the main power supply part 33 not to allow the main power supply switches 2a-2c to be turned on, this state is only kept but the main power supply switches 2a-2c are not allowed to turn on.

In this state, when, according to the operation of the operator, the operation state of the robot is switched over to a state where the welding machine output is necessary, the robot control part 31 instructs the main power supply control part 33 that to turn on the main power supply switches 2a-2c is allowed. Simultaneously with this instruction, the main power supply control part 33 closes the opening/closing switches 22a and 22b and also standby charges the capacitor 21 and, after then, turns on the main power supply switches 2a-2c and also turns off the opening/closing switches 22a and 22b, thereby supplying power to the inverter circuit 1. That is, by holding the above-mentioned state where to turn on the main power supply switches 2a-2c is allowed, even if the manually operated button 32 is not depressed, at the time when the robot operation state becomes a state requiring the welding machine output due to the operation by the operator, the welding machine output is started in linking with such robot operation state.

On the contrary, when, according to the operation of the operator, the robot operation state is switched over to a state not requiring the welding machine output, the robot control part 31 instructs the main power supply control part 33 that to turn on the main power supply switches 2a-2c is prohibited; and, the main power supply control part 33 turns off the main power supply switches 2a-2c and also opens the opening/closing switches 22a and 22b, thereby cutting off the power supply to the inverter circuit 1.

Also, in the robot operation, there is necessary an operation button (for example, a servo-on switch which is used to instruct the on of the main power supply) for turning on the robot operation control. Actually, according to the present embodiment, this robot operation control can also be carried out by using the manually operated button 32 capable of controlling the on/off of the main power supply switches 2a-2c, so that the main power supply switches 2a-2c can be controlled in synchronization with the effective/invalid states of the robot operation.

By the way, although the illustration and description thereof are omitted here, when the emergency stop switch 4 is depressed, as previously described in the embodiment 1 with reference to FIG. 1, the robot emergency stop function is carried out simultaneously with the depression of the emergency stop switch 4.

As described above, according to the present embodiment, the main power supply switches can be turned off using the manually operated button, the main power supply of the welding machine can be turned off according to the need of the operator without depressing the emergency stop switch, and the welding machine can be operated safely and simply.

Also, even in the control unit including the capacitor for driving the inverter circuit stably, the main power supply switch can be turned off using the manually operated button, the standby charge path to the capacitor can be cut off, the main supply of the welding machine can be cut off according to the need of the operator without depressing the emergency stop switch, and the welding machine can be operated safely and simply.

And, in a case where the emergency stop switch is removed, if the main power supply is turned on by pressing down the manually operated button, the main power supply of the welding machine can be turned on according to the intention of the operator and also the welding machine can be operated safely and simply.

Also, since the on/off of the main power supply switch is controlled according to the operation state of the robot, in an operation state not requiring the welding machine output, there can be eliminated the need for execution of the charging/discharging operation with respect to the capacitor 21, which can extend the lives of the composing parts of the control unit and also can enhance the reliability and maintenance convenience of the control unit.

Further, since the manually operated button can be used also as an operation button for turning on the operation control of the robot, not only the main power supply control can be executed simply and easily in synchronization with the robot operation but also the number of parts of the control unit can be reduced and the control unit can be operated simply and easily.

INDUSTRIAL PRACTIABILITY

An arc welding robot control unit according to the invention can cut off output of the welding machine simultaneously with the emergency stop of the robot and thus is useful for the power supply control of an arc welding robot composed of a welding machine and a robot unified as an integral body.

The invention claimed is:

1. An arc welding robot control unit for controlling the output of a welding machine and the operation of a robot in an integral manner, comprising:
   a robot control part;
   an inverter circuit for enforcing arc welding;
   a capacitor for driving the inverter circuit stably;
   a main power supply switch for turning on and off a main power supply for supplying power to the inverter circuit;
   a standby charge path for standby charging the capacitor before the main power supply switch turns on the main power supply;
   an opening/closing switch for opening and closing the standby charge path for standby charging the capacitor;
   a manually operated button for turning on and off the main power supply;
   a main power supply control part for controlling the on and off of the main power supply in accordance with an instruction indicating whether there is a demand for welding machine output; and
   an emergency stop button for emergency stopping the operation of the robot,
   wherein, when the emergency stop button is depressed to thereby put the robot into emergency stop the opening/closing switch and the main power supply switch are also substantially simultaneously opened to cut off the power supply path to the inverter circuit.

2. An arc welding robot control unit as set forth in claim 1, wherein the manually-operated button is used also as an operation button for turning on the operation control of the robot.

3. An arc welding robot control unit as set forth in claim 1, wherein the main power supply control part is able to turn on the main power supply only when the manually operated button is depressed in a state where the emergency stop button for the robot is removed.

4. An arc welding robot control unit as set forth in claim 1, wherein the main power supply control part controls the on and off of the main power supply according to whether the robot operation state requires a welding machine output or not.

5. An arc welding robot control unit as set forth in claim 4, wherein the main power supply control part turns on the main power supply using the manually operated button only when the robot operation state becomes a state requiring the welding machine output in the emergency stop removed state.

6. An arc welding robot control unit as set forth in claim 4, wherein the main power supply control part, when the manually operated button is depressed in the emergency stop removed state, holds this state and, simultaneously when the robot operation state becomes a state requiring the welding machine output, turns on the main power supply.

* * * * *